United States Patent
Choi et al.

(10) Patent No.: US 12,298,429 B2
(45) Date of Patent: *May 13, 2025

(54) METHOD AND APPARATUS WITH RADAR SIGNAL PROCESSING

(71) Applicant: SAMSUNG ELECTRONICS CO., LTD., Suwon-si (KR)

(72) Inventors: Sungdo Choi, Suwon-si (KR); Jong-Sok Kim, Hwaseong-si (KR); Young Rae Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,145

(22) Filed: Oct. 27, 2023

(65) Prior Publication Data

US 2024/0053435 A1 Feb. 15, 2024

Related U.S. Application Data

(63) Continuation of application No. 17/331,074, filed on May 26, 2021, now Pat. No. 11,802,939.

(30) Foreign Application Priority Data

Nov. 16, 2020 (KR) .................. 10-2020-0153048
Dec. 15, 2020 (KR) .................. 10-2020-0175857

(51) Int. Cl.
*G01S 7/35* (2006.01)
*G01S 13/536* (2006.01)
(Continued)

(52) U.S. Cl.
CPC ............. *G01S 7/354* (2013.01); *G01S 7/356* (2021.05); *G01S 13/536* (2013.01); *G01S 13/584* (2013.01); *G01S 13/931* (2013.01)

(58) Field of Classification Search
CPC ........ G01S 7/354; G01S 7/356; G01S 13/536; G01S 13/584; G01S 13/931
(Continued)

(56) References Cited

U.S. PATENT DOCUMENTS

| 625 A | 3/1838 | Rice |
|---|---|---|
| 915 A | 9/1838 | Stweart |

(Continued)

FOREIGN PATENT DOCUMENTS

| EP | 3015880 A1 * | 5/2016 | ........... G01S 13/227 |
|---|---|---|---|
| EP | 3285230 A1 * | 2/2018 | ........... G01S 13/589 |

(Continued)

OTHER PUBLICATIONS

Wang, Wei, Jinsong Du, and Jie Gao. "Multi-Target Detection Method Based on Variable Carrier Frequency Chirp Sequence." Sensors 18.10 (2018): 3386. (12 pages in English).

(Continued)

*Primary Examiner* — Nuzhat Pervin
(74) *Attorney, Agent, or Firm* — NSIP Law

(57) ABSTRACT

A radar signal processing method includes: extracting a first chirp sequence signal of a first carrier frequency and a second chirp sequence signal of a second carrier frequency from a radar signal received through an array antenna in a radar sensor; generating a first range-Doppler map by performing frequency conversion on the first chirp sequence signal; detecting a first target cell corresponding to a first target in the first range-Doppler map; determining a first ambiguous Doppler velocity of the first target based on first frequency information of the first target cell; determining a first range of an unambiguously measurable Doppler velocity through the first chirp sequence signal; estimating second ambiguous Doppler velocities based on the first ambiguous Doppler velocity and the first range; and determining a (Continued)

Doppler velocity of the first target by performing partial frequency conversion on the second chirp sequence signal based on the second ambiguous Doppler velocities.

20 Claims, 11 Drawing Sheets

(51) Int. Cl.
G01S 13/58 (2006.01)
G01S 13/931 (2020.01)
(58) Field of Classification Search
USPC .......................................................... 342/93
See application file for complete search history.

(56) References Cited

U.S. PATENT DOCUMENTS

| | | | |
|---|---|---|---|
| 1,001 A | 11/1838 | Atwater | |
| 1,212 A | 6/1839 | Smith | |
| 3,935,572 A * | 1/1976 | Broniwitz | H01Q 1/421 |
| | | | 342/107 |
| 5,657,022 A * | 8/1997 | Van Etten | G01S 13/0209 |
| | | | 342/107 |
| 6,384,771 B1 * | 5/2002 | Montague | G01S 7/4052 |
| | | | 342/170 |
| 9,746,546 B2 * | 8/2017 | Lee | G01S 13/584 |
| 9,921,305 B2 * | 3/2018 | Cao | G01S 7/2927 |
| 10,620,304 B2 | 4/2020 | Halbert et al. | |
| 10,775,489 B2 * | 9/2020 | Rao | G01S 13/931 |
| 10,921,436 B2 * | 2/2021 | Jansen | G01S 7/352 |
| 10,962,636 B2 * | 3/2021 | Longman | G01S 13/582 |
| 11,119,185 B2 * | 9/2021 | Barkan | G01S 13/522 |
| 11,513,187 B2 * | 11/2022 | Stettiner | G01S 7/2883 |
| 11,609,303 B2 * | 3/2023 | Stettiner | G01S 7/2883 |
| 11,703,587 B2 * | 7/2023 | Duque Biarge | G01S 13/931 |
| | | | 342/70 |
| 2008/0204322 A1 * | 8/2008 | Oswald | G01S 5/04 |
| | | | 342/465 |
| 2014/0022114 A1 * | 1/2014 | Kamimura | G01S 7/4021 |
| | | | 342/134 |
| 2016/0124086 A1 * | 5/2016 | Jansen | G01S 13/931 |
| | | | 342/107 |
| 2017/0356991 A1 * | 12/2017 | Yosoku | G01S 13/60 |
| 2018/0203105 A1 * | 7/2018 | Kuehnle | G01S 13/0209 |
| 2019/0377062 A1 * | 12/2019 | Barkan | G01S 13/536 |
| 2020/0049810 A1 * | 2/2020 | Longman | G01S 13/582 |
| 2020/0116850 A1 * | 4/2020 | Santra | A61B 5/0507 |
| 2020/0200889 A1 * | 6/2020 | Dikshtein | G01S 7/292 |
| 2020/0233075 A1 * | 7/2020 | Sakamaki | G01S 13/88 |
| 2020/0241125 A1 * | 7/2020 | Sivadas | G01S 13/532 |
| 2020/0309939 A1 * | 10/2020 | Subburaj | G01S 13/584 |
| 2021/0003692 A1 * | 1/2021 | Nohmi | G01S 13/58 |
| 2021/0156980 A1 * | 5/2021 | Stettiner | G01S 7/2883 |
| 2021/0156981 A1 * | 5/2021 | Stettiner | G01S 13/931 |
| 2021/0255303 A1 * | 8/2021 | Laghezza | G01S 7/415 |
| 2021/0270933 A1 * | 9/2021 | Hakobyan | G01S 7/354 |
| 2021/0270934 A1 * | 9/2021 | Hakobyan | G01S 13/584 |
| 2024/0134035 A1 * | 4/2024 | Gang | G01S 13/931 |

FOREIGN PATENT DOCUMENTS

| | | | | |
|---|---|---|---|---|
| EP | 3454079 A1 * | 3/2019 | | G01S 13/08 |
| EP | 3467537 A1 * | 4/2019 | | B60W 30/08 |
| EP | 3611538 A1 * | 2/2020 | | G01S 13/325 |
| JP | 2010281605 A * | 12/2010 | | G01S 13/24 |
| KR | 10-2015-0003330 A | 1/2015 | | |
| WO | WO-2020018805 A1 * | 1/2020 | | G01S 17/34 |

OTHER PUBLICATIONS

U.S. Appl. No. 17/331,074, filed May 26, 2021, Jong-Sok Kim et al., Samsung Electro-Mechanics Col, Ltd.

* cited by examiner

METHOD AND APPARATUS WITH RADAR SIGNAL PROCESSING

CROSS-REFERENCE TO RELATED APPLICATIONS

This application is a continuation of U.S. patent application Ser. No. 17/331,074 filed on May 26, 2021 which claims the benefit under 35 USC § 119(a) of Korean Patent Application No. 10-2020-0153048 filed on Nov. 16, 2020, and Korean Patent Application No. 10-2020-0175857 filed on Dec. 15, 2020, in the Korean Intellectual Property Office, the entire disclosures of which are incorporated herein by reference for all purposes.

BACKGROUND

1. Field

The following description relates to a method and apparatus with radar signal processing.

2. Description of Related Art

Advanced driver-assistance systems (ADAS) may be systems that support driving to improve driver's safety and convenience and to avoid dangerous situations by using sensors mounted inside or outside vehicles.

The sensors used in ADAS may include a camera, an infrared sensor, an ultrasonic sensor, a LiDAR, and a radar.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a radar signal processing method includes: extracting a first chirp sequence signal of a first carrier frequency and a second chirp sequence signal of a second carrier frequency from a radar signal received through an array antenna in a radar sensor; generating a first range-Doppler map by performing frequency conversion on the first chirp sequence signal; detecting a first target cell corresponding to a first target in the first range-Doppler map; determining a first ambiguous Doppler velocity of the first target based on first frequency information of the first target cell; determining a first range of an unambiguously measurable Doppler velocity through the first chirp sequence signal; estimating second ambiguous Doppler velocities based on the first ambiguous Doppler velocity and the first range; and determining a Doppler velocity of the first target by performing partial frequency conversion on the second chirp sequence signal based on the second ambiguous Doppler velocities.

The determining of the Doppler velocity of the first target may include: determining an optimal ambiguity number using the second ambiguous Doppler velocities; and determining the Doppler velocity of the first target based on the optimal ambiguity number.

The determining of the Doppler velocity of the first target may include: determining an optimal ambiguity number by performing partial frequency conversion on the second chirp sequence signal based on the second ambiguous Doppler velocities; and determining the Doppler velocity of the first target based on the first ambiguous Doppler velocity, the optimal ambiguity number, and the first range.

The determining of the optimal ambiguity number may include: mapping the second ambiguous Doppler velocities to a Doppler spectrum of the second chirp sequence signal; and determining an ambiguity number of a value that is the greatest on the Doppler spectrum among the second ambiguous Doppler velocities to be the optimal ambiguity number.

The first range may be determined based on a chirp repetition period of the first chirp sequence signal.

The frequency conversion on the first chirp sequence signal may be a two-dimensional Fourier transform including a first Fourier transform based on a range and a second Fourier transform based on a Doppler frequency.

The detecting of the first target cell may include detecting the first target cell through constant false alarm rate (CFAR) detection on the first range-Doppler map.

The second ambiguous Doppler velocities may correspond to candidates for the unambiguously measurable Doppler velocity.

First chirps of the first chirp sequence signal and second chirps of the second chirp sequence signal may appear alternately in the radar signal.

The ambiguity of the first ambiguous Doppler velocity and the second ambiguous Doppler velocities may be a result of an aliasing effect.

A non-transitory computer-readable storage medium may store instructions that, when executed by a processor, configure the processor to perform the method.

In another general aspect, a radar signal processing apparatus includes: a radar sensor configured to receive a radar signal through an array antenna; and a processor configured to extract a first chirp sequence signal of a first carrier frequency and a second chirp sequence signal of a second carrier frequency from the received radar signal, generate a first range-Doppler map by performing frequency conversion on the first chirp sequence signal, detect a first target cell corresponding to a first target in the first range-Doppler map, to determine a first ambiguous Doppler velocity of the first target based on first frequency information of the first target cell, determine a first range of an unambiguously measurable Doppler velocity through the first chirp sequence signal, estimate second ambiguous Doppler velocities based on the first ambiguous Doppler velocity and the first range, and determine a Doppler velocity of the first target by performing partial frequency conversion on the second chirp sequence signal based on the second ambiguous Doppler velocities.

For the determining of the Doppler velocity of the first target, the processor may be configured to: determine an optimal ambiguity number using the second ambiguous Doppler velocities; and determine the Doppler velocity of the first target based on the optimal ambiguity number.

For the determining of the Doppler velocity of the first target, the processor may be configured to: determine an optimal ambiguity number by performing partial frequency conversion on the second chirp sequence signal based on the second ambiguous Doppler velocities; and determine the Doppler velocity of the first target based on the first ambiguous Doppler velocity, the optimal ambiguity number, and the first range.

For the determining of the optimal ambiguity number, the processor may be configured to: map the second ambiguous Doppler velocities to a Doppler spectrum of the second chirp sequence signal; and determine an ambiguity number of a value that is the greatest on the Doppler spectrum among the second ambiguous Doppler velocities to be the optimal ambiguity number.

The frequency conversion on the first chirp sequence signal may be a two-dimensional Fourier transform including a first Fourier transform based on a range and a second Fourier transform based on a Doppler frequency.

For the detecting of the first target cell, the processor may be configured to detect the first target cell through constant false alarm rate (CFAR) detection on the first range-Doppler map.

In another general aspect, a vehicle includes: a radar sensor configured to receive a radar signal through an array antenna; a processor configured to extract a first chirp sequence signal of a first carrier frequency and a second chirp sequence signal of a second carrier frequency from the received radar signal, generate a first range-Doppler map by performing frequency conversion on the first chirp sequence signal, detect a first target cell corresponding to a first target in the first range-Doppler map, determine a first ambiguous Doppler velocity of the first target based on first frequency information of the first target cell, determine a first range of an unambiguously measurable Doppler velocity through the first chirp sequence signal, estimate second ambiguous Doppler velocities based on the first ambiguous Doppler velocity and the first range, and determine a Doppler velocity of the first target by performing partial frequency conversion on the second chirp sequence signal based on the second ambiguous Doppler velocities; and a controller configured to control the vehicle based on the Doppler velocity.

For the determining of the Doppler velocity of the first target, the processor may be configured to: determine an optimal ambiguity number using the second ambiguous Doppler velocities; and determine the Doppler velocity of the first target using the optimal ambiguity number.

For the determining of the Doppler velocity of the first target, the processor may be configured to: determine an optimal ambiguity number by performing partial frequency conversion on the second chirp sequence signal based on the second ambiguous Doppler velocities; and determine the Doppler velocity of the first target based on the first ambiguous Doppler velocity, the optimal ambiguity number, and the first range.

In another general aspect, a radar signal processing method includes: generating a Doppler spectrum by performing frequency conversion on a first chirp sequence signal of a first carrier frequency; determining ambiguous Doppler velocities based on the Doppler spectrum; generating a partial Doppler spectrum by performing partial frequency conversion on a second chirp sequence signal of a second carrier frequency, based the ambiguous Doppler velocities; and determining a Doppler velocity of a target based on one or more of the ambiguous Doppler velocities and the partial Doppler spectrum.

The determining of the ambiguous Doppler velocities may include determining a first ambiguous Doppler velocity based on the Doppler spectrum and determining second ambiguous Doppler velocities based on the first ambiguous Doppler velocity, and the generating of the partial Doppler spectrum may include generating the partial Doppler spectrum based on the second ambiguous Doppler velocities.

The determined Doppler velocity of the target may correspond to a greatest ambiguity number among ambiguity numbers of the second ambiguous Doppler velocities mapped to the partial Doppler spectrum.

The determining of the first ambiguous Doppler velocity may include determining a maximum value of the Doppler spectrum to be the first ambiguous Doppler velocity.

Other features and aspects will be apparent from the following detailed description, the drawings, and the claims.

Figure 1:
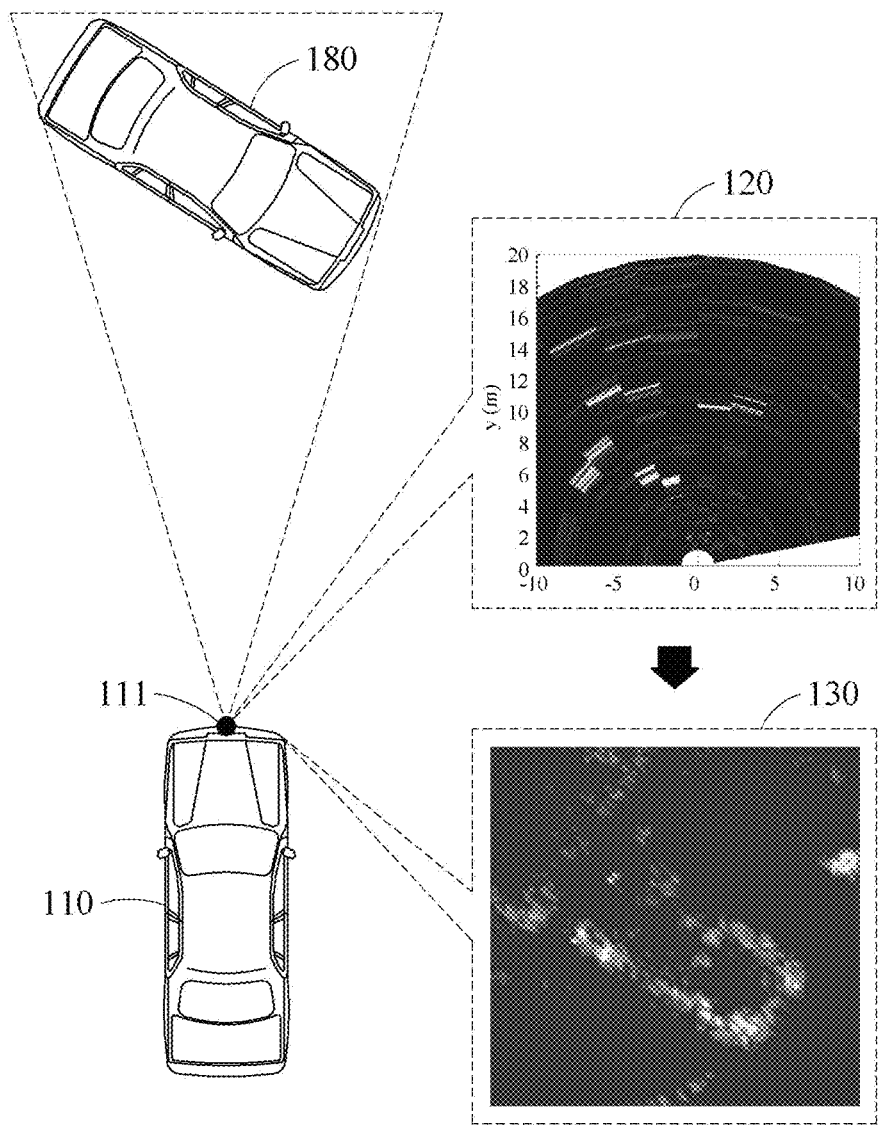
FIG. 1 illustrates an example of recognizing a surrounding environment through a radar signal processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains after and understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of recognizing a surrounding environment through a radar signal processing method. Among sensors that may be used in advanced driver-assistance systems (ADAS) (e.g., such as a camera, an infrared sensor, an ultrasonic sensor, a LiDAR, and/or a radar), radar may stably measure objects in a vicinity of a vehicle without being affected by a surrounding environment, such as weather, when compared to optical-based sensors. Referring to FIG. 1, a radar signal processing apparatus 110 may detect information on a target 180 ahead (for example, range, velocity, direction, and/or the like) by analyzing a radar signal received from a radar sensor 111. The radar sensor 111 may be positioned inside or outside the radar signal processing apparatus 110, and the radar signal processing apparatus 110 may detect the information on the target 180 ahead based on both the radar signal received from the radar sensor 111 and data collected by another sensor (for example, an image sensor, etc.). Resolving power in radar data processing may be divided into resolving power performance in terms of hardware and resolving power performance in terms of software. Hereinafter, improvement of the resolving of power performance in terms of software will be mainly described.

In an example, the resolving power may refer to the power of a device to discriminate a very small change (for example, smallest unit discriminative power), and it may be expressed as "resolving power=(discriminable smallest scale unit)/(total operation range)". The smaller the resolving power value of the device, the more precise results the device may output. The resolving power value may also be referred to as the resolving power unit. For example, when the device has a small resolving power value, the device may discriminate a relatively small unit and thus, the device may output results with increased resolution and improved precision. When the device has a great resolving power value, the device may not discriminate a small unit and thus, the device may output results with reduced resolution and reduced precision.

The radar signal processing apparatus 110 may be mounted on a vehicle as shown in FIG. 1. The vehicle may perform adaptive cruise control (ACC), automatic emergency braking (AEB), blind spot detection (BSD), lane change assistance (LCA), and/or other similar operations based on the range to the target 180 detected by the radar signal processing apparatus 110. Furthermore, the radar signal processing apparatus 110 may generate a surrounding map 130 in addition to detecting the range. The surrounding map 130 may be a map representing the positions of various targets existing around the radar signal processing apparatus 110, such as the target 180. The targets may include moving objects (such as vehicles and/or people, for example) and static objects (such as guardrails and/or traffic lights present in the background, for example).

The surrounding map 130 may be generated using single scan imaging. Single scan imaging may refer to a technique of the radar signal processing apparatus 110 acquiring a single scan image 120 from the sensor and generating the surrounding map 130 from the acquired single scan image 120. The single scan image 120 may be an image generated from the radar signal sensed by a single radar sensor 111, and may represent the ranges indicated by radar signals received at a predetermined elevation angle with a relatively high resolving power. For example, in the single scan image 120 shown in FIG. 1, the horizontal axis may denote the steering angle of the radar sensor 111, and the vertical axis may denote the range from the radar sensor 111 to the target 180. However, the form of a single scan image is not limited to that shown in FIG. 1. The single scan image may be represented in a different format according to design.

The steering angle may be an angle corresponding to a target direction from the radar signal processing apparatus 110 toward the target 180. For example, the steering angle may be an angle between the target direction and the traveling direction of the radar signal processing apparatus 110 (or the vehicle including the radar signal processing apparatus 110). In an example, the steering angle is described mainly based on a horizontal angle, but is not limited thereto. For example, the steering angle may also be applied to an elevation angle.

The radar signal processing apparatus 110 may obtain information on the shape of the target 180 through a multi-radar map. The multi-radar map may be generated from a combination of a plurality of radar scan images. For example, the radar signal processing apparatus 110 may generate the surrounding map 130 by spatiotemporally combining the radar scan images acquired as the radar sensor 111 moves. The surrounding map 130 may be a type of radar image map and may be used for pilot parking.

The radar signal processing apparatus 110 may use direction of arrival (DOA) information to generate the surrounding map 130. The DOA information may refer to information indicating the direction in which a radar signal reflected from a target is received. The radar signal processing apparatus 110 may identify the direction in which the target exists relative to the radar sensor 111 using the DOA information described above. Therefore, such DOA information may be used to generate radar scan data and surrounding maps.

Radar information (such as range, velocity, DOA, and map information, for example) about the target 180 generated by the radar signal processing apparatus 110 may be used to control the vehicle equipped with the radar signal processing apparatus 110. For example, controlling the vehicle may include controlling the speed and steering of the vehicle, such as in ACC, AEB, BSD, and LCA. A controller of the vehicle may control the vehicle directly or indirectly based on the radar information. For example, when a Doppler velocity of a target is measured, the controller may accelerate the vehicle to follow the target or may brake the vehicle to prevent a collision with the target. The vehicle may be the radar signal processing apparatus 110, or the vehicle may include the radar signal processing apparatus 110, according to non-limiting examples.

Figure 2:
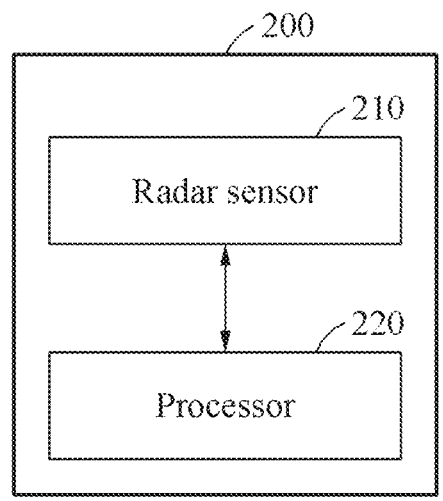
FIG. 2 illustrates an example of a configuration of a radar signal processing apparatus.

FIG. 2 illustrates an example of a configuration of a radar signal processing apparatus. Referring to FIG. 2, a radar signal processing apparatus 200 may include a radar sensor 210 and a processor 220 (e.g., one or more processors). The radar signal processing apparatus 110 of FIG. 1 may be or include the radar signal processing apparatus 200, according to non-limiting examples. The radar sensor 210 may radiate a radar signal to the outside of the radar sensor 210 and receive a signal when the radiated radar signal is reflected by a target. Here, the radiated radar signal may be referred to as a radar transmission signal, and the received signal may be referred to as a radar reception signal. The radar transmission signal may include a chirp signal with a carrier frequency modulated based on a frequency modulation model. The frequency of the radar transmission signal may change within a predetermined band. For example, the frequency of the radar transmission signal may linearly change within a predetermined band.

The radar sensor 210 may include an array antenna and may be configured to transmit a radar transmission signal and receive a radar reception signal through the array antenna. The array antenna may include a plurality of antenna elements. Multiple input multiple output (MIMO) may be implemented through the plurality of antenna elements. In this case, a plurality of MIMO channels may be formed by the plurality of antenna elements. For example, a plurality of channels corresponding to M×N virtual antennas may be formed through M transmission antenna elements and N reception antenna elements. Here, radar reception signals received through the channels may have different phases according to reception directions.

Radar data may be generated based on the radar transmission signal and the radar reception signal. For example, the radar sensor 210 may transmit the radar transmission signal through the array antenna based on the frequency modulation model, receive the radar reception signal through the array antenna when the radar transmission signal is reflected by the target, and generate an intermediate frequency (IF) signal based on the radar transmission signal and the radar reception signal. The IF signal may have a frequency corresponding to a difference between the frequency of the radar transmission signal and the frequency of the radar reception signal. The processor 220 may perform a sampling operation on the IF signal, and generate radar data through a sampling result. The radar data may correspond to raw data of an IF.

The processor 220 may generate and use information on the target based on the radar data. For example, the processor 220 may perform range fast Fourier transform (FFT), Doppler FFT, constant false alarm rate (CFAR) detection, DOA estimation, and/or the like based on the radar data, and obtain the information on the target (such as range, velocity, and/or direction, for example). Such information on the target may be provided and used for various applications such as ACC, AEB, BSD, and LCA.

Figure 3:
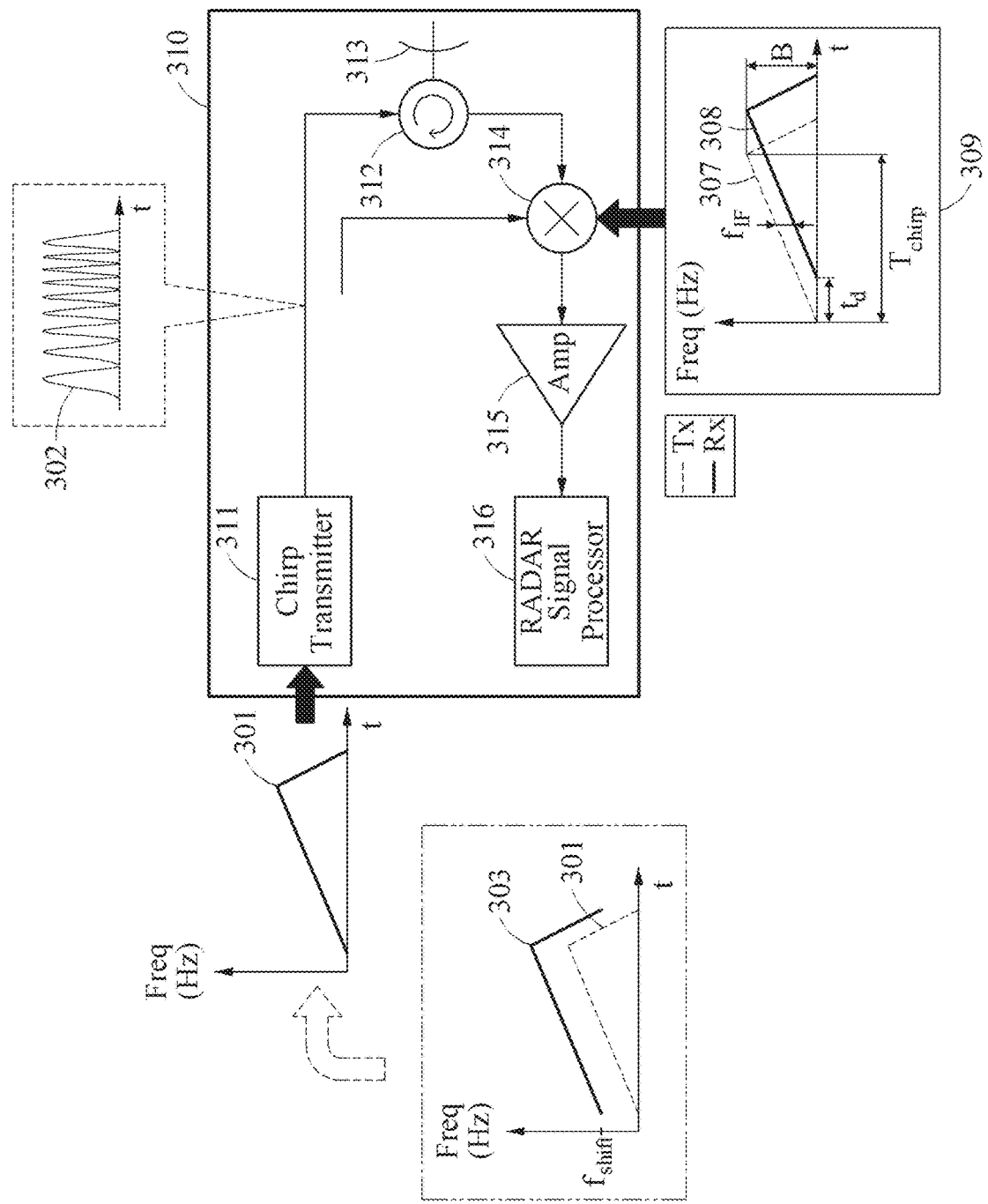
FIG. 3 illustrates an example of a configuration of a radar sensor.

FIG. 3 illustrates an example of a configuration of a radar sensor. Referring to FIG. 3, a radar sensor 310 may include a chirp transmitter 311, a duplexer 312, an antenna 313, a frequency mixer 314, an amplifier 315, and a radar signal processor 316. The radar sensor 210 of FIG. 2 may be or include the radar sensor 310, according to non-limiting examples. The radar signal processor 316 may correspond to the processor 220 of FIG. 2. In an example, the radar signal processor 316 may be disposed outside the radar sensor 310, like the processor 220. The radar sensor 310 may radiate a signal through the antenna 313 and may receive a signal through the antenna 313. The antenna 313 may include one or more transmission antenna elements and one or more reception antenna elements. For example, the antenna 313 may correspond to an array antenna. For example, the antenna 313 may include three or more reception antenna elements. In this case, the reception antenna elements may be spaced apart at equal intervals.

The radar sensor 310 may be, for example, a millimeter-wave (mmWave) radar and may be configured to measure the range to a target by analyzing a time of flight (ToF) and changes in the waveform of the radar signal, wherein the ToF is the time it takes for a radiated electromagnetic wave to return after reflected by the target. For reference, the mmWave radar may detect an object regardless of external environment changes such as fog, rain, and the like, compared to optical sensors including cameras. In addition, the mmWave radar has excellent cost performance compared to LiDAR and thus, is one of the sensors that may compensate for the disadvantages of the cameras described above. For example, the radar sensor 310 may be implemented as a frequency modulated continuous wave (FMCW) radar. The FMCW radar may be robust against external noise.

The chirp transmitter 311 may generate a frequency modulated signal (FM signal) 302 with a frequency that changes with time. For example, the chirp transmitter 311 may generate the FM signal 302 by performing frequency modulation according to the frequency modulation characteristics of a frequency modulation model 301. The FM signal 302 may also be referred to as a chirp signal. Herein, the frequency modulation model 301 may be a model configured to represent changes in a carrier frequency of a radar transmission signal during a provided transmission time. The vertical axis of the frequency modulation model 301 may denote the carrier frequency, and the horizontal axis thereof may denote time. For example, the frequency modulation model 301 may have a frequency modulation characteristic of linearly changing (for example, linearly increasing or linearly decreasing) the carrier frequency. As another example, the frequency modulation model 301 may have a frequency modulation characteristic of non-linearly changing the carrier frequency.

FIG. 3 shows the frequency modulation model 301 having a frequency modulation characteristic of linearly increasing the frequency over time. The chirp transmitter 311 may generate the FM signal 302 having a carrier frequency according to the frequency modulation model 301. For example, as shown in FIG. 3, the FM signal 302 may exhibit a waveform in which the carrier frequency gradually increases in some intervals, and exhibit a waveform in which the carrier frequency gradually decreases in the remaining intervals.

The chirp transmitter 311 may generate the FM signal 302 using frequency modulation models 301 and 303. For example, the chirp transmitter 311 may generate the FM signal 302 by alternately using the frequency modulation model 301 and the frequency modulation model 303. In this example, the FM signal 302 may alternately include a chirp sequence signal interval according to the frequency modulation model 301 and a chirp sequence signal interval according to the frequency modulation model 303. There may be a frequency difference corresponding to a difference value $f_{shift}$ between a chirp of the frequency modulation model 301 and a chirp of the frequency modulation model 303. Such various chirp sequences of carrier frequencies may be used to extend the range of a maximum measurable Doppler velocity. The Doppler velocity may also be referred to as a radial velocity. Non-limiting examples of the extension of the velocity range will be further described later.

The chirp transmitter 311 may transmit the FM signal 302 to the duplexer 312. The duplexer 312 may determine a transmission path and a reception path for signals through the antenna 313. For example, while the radar sensor 310 radiates the FM signal 302, the duplexer 312 may form a signal path from the chirp transmitter 311 to the antenna 313, transmit the FM signal 302 to the antenna 313 through the formed signal path, and then radiate the FM signal 302 to the outside. While the radar sensor 310 receives the signal reflected from the target, the duplexer 312 may form a signal path from antenna 313 to the radar signal processor 316. The antenna 313 may receive a reception signal returning when the radiated signal reaches and is reflected by an obstacle. The radar sensor 310 may transmit the reception signal to the radar signal processor 316 through the signal path from the antenna 313 to the radar signal processor 316. The signal radiated through the antenna 313 may be referred to as a radar transmission signal, and the signal received through the antenna 313 may be referred to as a radar reception signal.

The frequency mixer 314 may compare a frequency 308 of the radar reception signal that is reflected from the target and received and a frequency 307 of the radar transmission signal. For reference, the frequency 307 of the radar transmission signal may change as the carrier frequency indicated by the frequency modulation model 301 changes. The frequency mixer 314 may detect a beat frequency corresponding to a frequency difference between the frequency 308 of the radar reception signal and the frequency 307 of the radar transmission signal. In a graph 309 shown in FIG. 3, the frequency difference between the radar transmission signal and the radar reception signal is constant during an interval in which the carrier frequency linearly increases along the time axis in the frequency modulation model 301, and is proportional to the range between the radar sensor 310 and the target. Accordingly, the range between the radar sensor 310 and the target may be derived from the frequency difference between the radar transmission signal and the radar reception signal. The beat frequency signal detected through the frequency mixer 314 may be transmitted to the radar signal processor 316 via the amplifier 315.

A plurality of radar sensors may be installed in various parts of a vehicle, and a radar signal processing apparatus (e.g., the radar signal processing apparatus 110 and/or the radar signal processing apparatus 200) may calculate a distance to a target, a direction, and a relative velocity in all directions of the vehicle based on information sensed by the plurality of radar sensors. The radar signal processing apparatus may be mounted on the vehicle, and may provide various functions (for example, ACC, AEB, BSD, LCA, etc.) that are useful for driving by using the calculated information.

Each of the plurality of radar sensors may radiate a radar transmission signal including a chirp signal with a frequency modulated based on a frequency modulation model to the outside and receive a signal reflected from the target. The processor of the radar signal processing apparatus may determine the distance from each of the plurality of radar sensors to a target from a frequency difference between the radiated radar transmission signal and the received radar reception signal. In addition, when the radar sensor 310 has a plurality of channels, the processor of the radar signal processing apparatus may derive a DOA of the radar reception signal reflected from the target based on phase information in the radar data.

The radar sensor 310 may use a wide bandwidth and adopt MIMO to meet the demands for a wide field of view (FoV) and a high resolution (HR) for various applications. The range resolution may increase through the wide bandwidth, and the angular resolution may increase through MIMO. The range resolution may represent the smallest unit to discriminate distance information on the target, and the angle resolution may represent the smallest unit to discriminate DOA information on the target. For example, the radar sensor 210 may use a broadband such as 4 GHz, 5 GHz, or 7 GHz instead of a narrow band such as 200 MHz, 500 MHz, or 1 GHz.

The radar sensor 310 may identify a transmission signal of each transmission antenna according to MIMO through time-division multiplexing (TDM). According to TDM, transmission antennas may alternately transmit transmission signals. Thus, the length of time of a rising interval of a carrier frequency of each transmission signal (that is, a chirp repetition period) may increase. This may cause a reduction in an unambiguously measurable Doppler velocity and/or in the range of the Doppler velocity. The radar sensor 310 of one or more embodiments may prevent a reduction in the Doppler velocity and/or in the range of the Doppler velocity by using the frequency modulation models 301 and 303 having different carrier frequencies.

Figure 4:
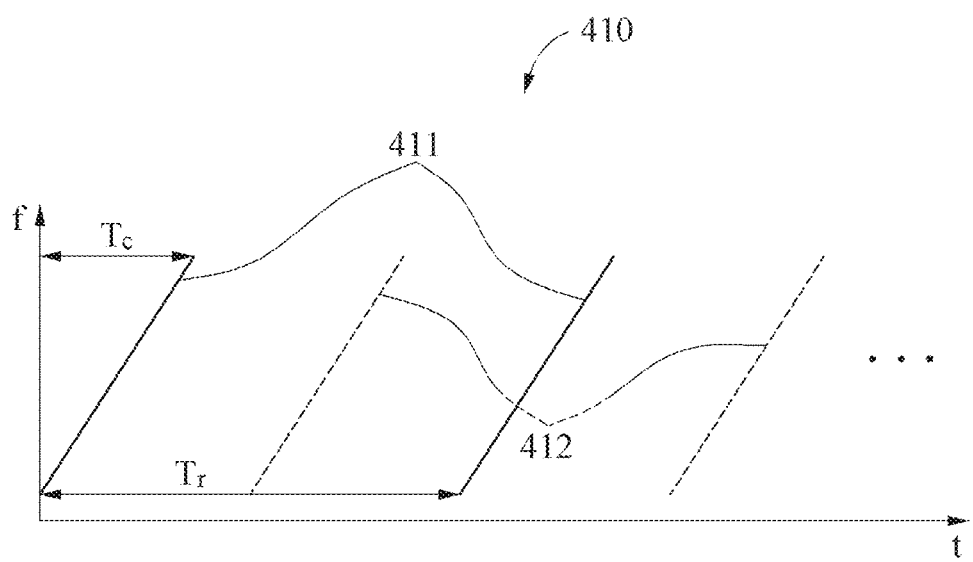
FIG. 4 illustrates an example of a change in a chirp repetition period according to time-division multiplexing (TDM).

FIG. 4 illustrates an example of a change in a chirp repetition period according to TDM. Referring to FIG. 4, a radar transmission signal 410 includes a first chirp sequence signal 411 and a second chirp sequence signal 412. For example, the first chirp sequence signal 411 may be transmitted by a first transmission antenna in a MIMO array antenna, and the second chirp sequence signal 412 may be transmitted by a second transmission antenna in the MIMO array antenna. In FIG. 4, $T_C$ denotes a chirp duration of the first chirp sequence signal 411, and $T_r$ denotes a repetition period of a chirp sequence.

In a method using a chirp sequence waveform, the range of a measurable Doppler velocity may be limited by the chirp repetition period. The maximum value of a measurable Doppler frequency may be expressed by Equation 1 below, for example.

$$f_{D,max} = \frac{1}{2T_p} \quad \text{Equation 1}$$

In Equation 1, $f_{D,max}$ denotes the maximum value of an unambiguously measurable Doppler frequency. The maximum range of the unambiguously measurable Doppler frequency may be from $-f_{D,max}$ to $f_{D,max}$. As shown in Equation 1, $f_{D,max}$ is dependent on $T_p$. In non-limiting examples, $T_p$ may be $T_C$ when the radar transmission signal 410 includes the first chirp sequence signal 411 and does not include the second chirp sequence signal 412, or $T_p$ may be $T_r$ when the radar transmission signal 410 includes both the first chirp sequence signal 411 and the second chirp sequence signal 412. According to Equation 2 below, which represents the relationship between the Doppler velocity and the Doppler frequency in an example, Equation 3 below may be derived.

$$f_D = -\frac{2}{\lambda}v \quad \text{Equation 2}$$

$$v_{D,max} = \frac{\lambda}{4T_p} \quad \text{Equation 3}$$

In Equation 2, $f_D$ denotes the Doppler frequency, $\lambda$ denotes the wavelength, and v denotes the Doppler velocity. In Equation 3, $V_{D,max}$ denotes the maximum value of the unambiguously measurable Doppler velocity. The maximum range of the unambiguously measurable Doppler velocity may be from $-V_{D,max}$ to $V_{D,max}$. Depending on the meaning of the maximum value, the sign may be omitted in the process of deriving Equation 3 through Equation 1 and Equation 2. In addition, since the Doppler velocity and the Doppler frequency may be converted to each other through Equation 2, the description of any one of the Doppler velocity and the Doppler frequency may apply also to the other one within an allowable range.

When the radar transmission signal 410 includes the first chirp sequence signal 411 and does not include the second chirp sequence signal 412, the chirp repetition period of the radar transmission signal 410 may be $T_C$. Alternatively, when the radar transmission signal 410 includes both the first chirp sequence signal 411 and the second chirp sequence signal 412 for TDM implementation, the chirp repetition period of the radar transmission signal 410 may be $T_r$. In this case where the chirp repetition period of the radar transmission signal 410 is $T_r$, the range of the unambiguously measurable Doppler velocity may decrease due to an increase in the chirp repetition period. For example, when $T_r$ is twice $T_C$, the measurable range of the Doppler velocity may be reduced to ½.

Figure 5:
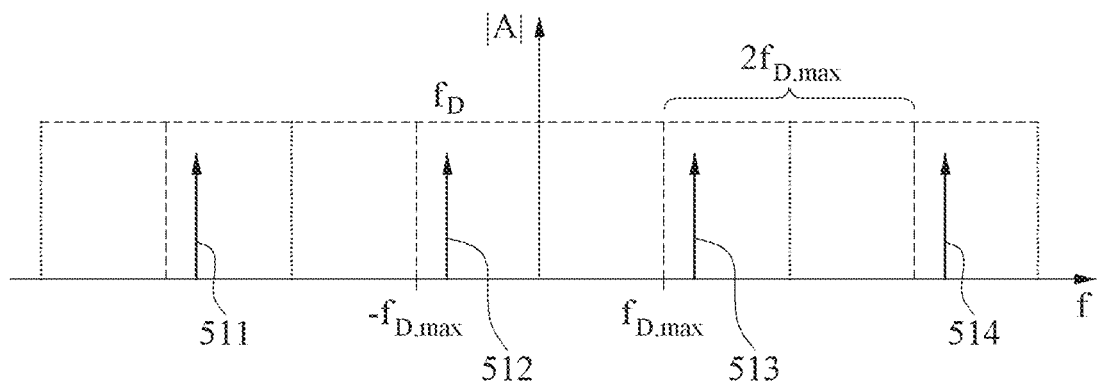
FIG. 5 illustrates an example of the range of a measurable frequency and the aliasing effect.

When the velocity of a target is out of the range of the maximum measurable velocity, such Doppler ambiguity may be an issue. Non-limiting examples of the Doppler ambiguity will be further described with reference to FIG. 5. FIG. 5 illustrates an example of the range of a measurable frequency and the aliasing effect. For example, a frequency value 512 may be measured as a Doppler frequency $f_D$ of a target through a Doppler spectrum of a radar reception signal. However, even when another frequency value 511, 513, or 514 is the Doppler frequency $f_D$ of the target in actuality, the Doppler frequency $f_D$ of the target may be erroneously measured as the frequency value 512 due to the aliasing effect. Accordingly, there may occur a case where it is unclear whether the frequency value 512 is the actual Doppler frequency $f_D$ of the target. Such Doppler ambiguity may be solved in theory by shortening the repetition period of a chirp sequence. However, there is a limit to a sampling frequency that may be implemented in hardware. Thus, when the repetition period of the chirp sequence is reduced, another issue such as a reduced measurable distance may arise.

Figure 6:
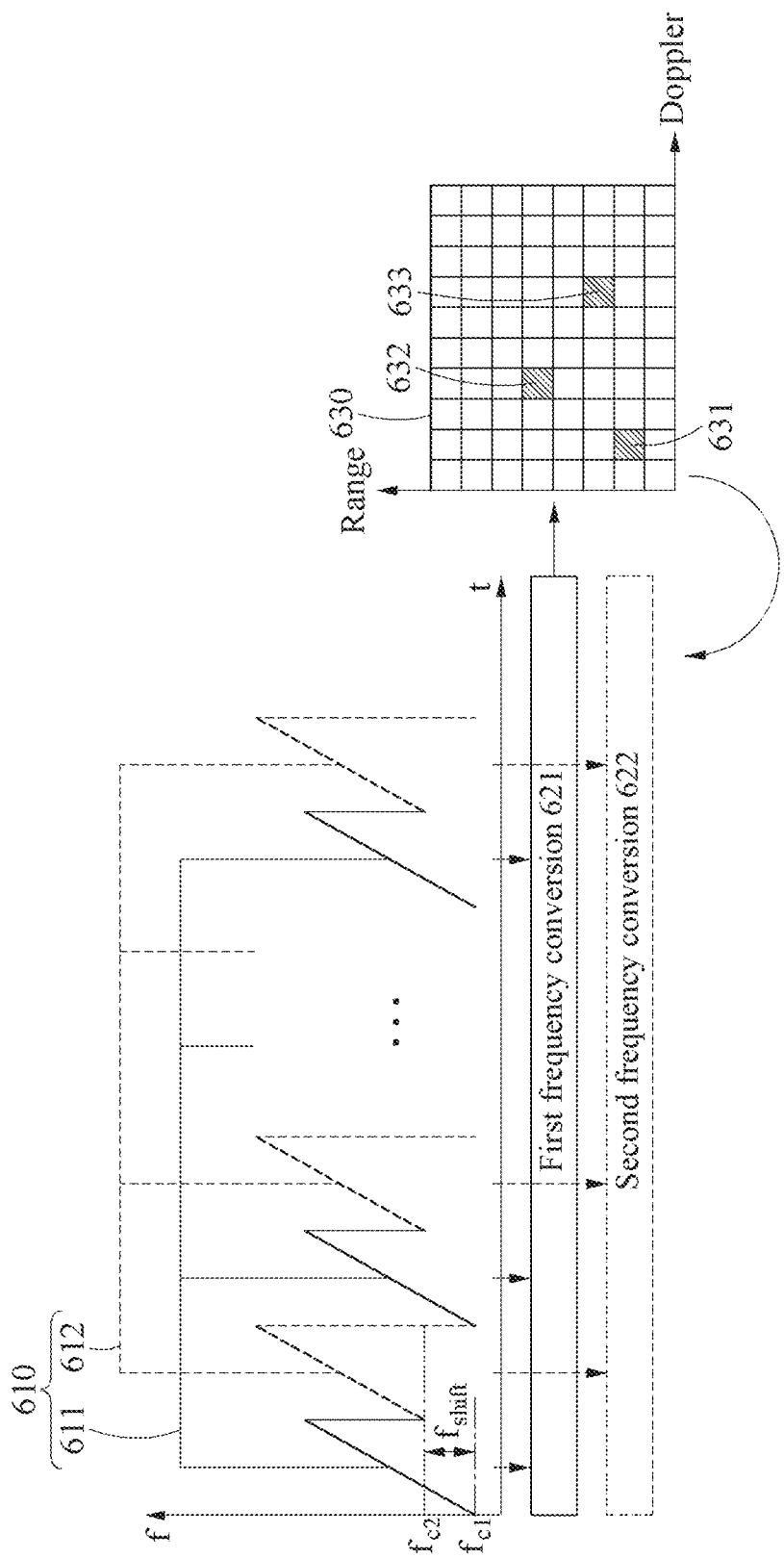
FIG. 6 illustrates an example of an operation of processing a radar signal using chirp sequences.

FIG. 6 illustrates an example of an operation of processing a radar signal using chirp sequences. Referring to FIG. 6, a radar signal 610 may include a first chirp sequence 611 of a first carrier frequency $f_{c1}$ and a second chirp sequence 612 of a second carrier frequency $f_{c2}$. For example, the radar signal 610 may be a transmission signal that is transmitted through any one transmission antenna element in an array antenna, reflected by a target, and received through any one reception antenna element in the array antenna.

As described above, the radar signal processing apparatus of one or more embodiments may solve the aforementioned Doppler ambiguity by using the radar signal 610 of various carrier frequencies and expanding the range of a measurable Doppler velocity. This scheme may be referred to as a variable carrier frequency scheme. According to the variable carrier frequency scheme, the Doppler ambiguity may be solved by using a difference between Doppler spectra caused by a shift of carrier frequencies between two adjacent chirps. More specifically, as learned from Equation 2 above, when signals of different carrier frequencies reflected by a target (for example, one target) having the same Doppler velocity are received, the Doppler velocity may be converted into different Doppler frequencies due to a difference in wavelength between the different carrier frequencies. This characteristic may be used to resolve the Doppler ambiguity.

The radar signal processing apparatus may obtain a first chirp sequence signal and a second chirp sequence signal through signal processing based on the first chirp sequence 611 and the second chirp sequence 612. For example, the signal processing may include frequency mixing, amplification, and spectrum analysis shown in FIG. 3, and the first chirp sequence signal and the second chirp sequence signal may correspond to raw IF data. The first chirp sequence signal and the second chirp sequence signal may be respectively expressed by Equations 4 and 5 below, for example.

$$s_1(t,l) = \exp(j2\pi(f_{B1} \cdot t - f_{D1} \cdot l \cdot T_p + \varphi_1)) \quad \text{Equation 4}$$

$$s_2(t,l) = \exp(j2\pi(f_{B2} \cdot t - f_{D2} \cdot l \cdot T_p + \varphi_2)) \quad \text{Equation 5}$$

In Equations 4 and 5, $s_1$ and $s_2$ denote the first chirp sequence signal and the second chirp sequence signal, respectively. t denotes time, l denotes the chirp number, and $T_p$ denotes the chirp duration. $f_{B1}$ and $f_{B2}$ denote beat frequencies (in other words, intermediate frequencies), $f_{D1}$ and $f_{D2}$ denote Doppler frequencies, and $\varphi_1$ and $\varphi_2$ denote phases.

The radar signal processing apparatus may generate a first range-Doppler map 630 by performing a first frequency conversion 621 on the first chirp sequence signal. For example, the first frequency conversion 621 may be a two-dimensional Fourier transform including a first Fourier transform based on a range and a second Fourier transform based on a Doppler frequency. Here, the first Fourier transform may be a range FFT, the second Fourier transform may be a Doppler FFT, and the two-dimensional Fourier transform may be a two-dimensional FFT. The radar signal processing apparatus may perform a range FFT based on the first chirp sequence signal, and may perform a Doppler FFT based on a result of the range FFT.

The radar signal processing apparatus may detect target cells 631 to 633 in the first range-Doppler map 630. For example, the radar signal processing apparatus may detect the target cells 631 to 633 through CFAR detection on the first range-Doppler map 630. CFAR detection is a thresholding-based detection technique. Hereinafter, a non-limiting example operation of determining the Doppler velocity of a first target corresponding to the first target cell 631, among the target cells 631 to 633, will be described. However, the operation may apply also to targets of the other target cells 632 and 633.

The radar signal processing apparatus may determine a first ambiguous Doppler velocity of the first target based on first frequency information of the first target cell 631. For example, the first target cell 631 may correspond to the maximum intensity in a Doppler spectrum of the first chirp sequence signal, and the first frequency information may indicate a Doppler frequency of the maximum intensity. The radar signal processing apparatus may determine a Doppler velocity corresponding to the Doppler frequency of the first target cell 631 to be the first ambiguous Doppler velocity of the first target.

The radar signal processing apparatus may estimate second ambiguous Doppler velocities based on the first ambiguous Doppler velocity and the range of velocity. Here, the range of velocity may be the range of a Doppler velocity that is unambiguously measurable through the first chirp sequence signal. Further, the second ambiguous Doppler velocities may correspond to candidates for an unambiguous Doppler velocity. The candidates for the unambiguous Doppler velocity may be derived through Equation 6 below, for example, in consideration of the aliasing effect.

$$v_{D1,unamb} = v_{D1,amb} + q \cdot (2v_{D1,max}) \quad \text{Equation 6}$$

In Equation 6, $V_{D1,unamb}$ denotes the unambiguous Doppler velocity, $V_{D1,amb}$ denotes the first ambiguous Doppler velocity, q denotes the ambiguity number, and $v_{D1,max}$ denotes the maximum range of the Doppler velocity that is unambiguously measurable through the first chirp sequence signal. q may have an integer value. By changing the value of q (for example, changing the value to −5, −4, . . . , 4, 5), various unambiguous Doppler velocities may be derived, and the derived unambiguous Doppler velocities may be referred to as the candidates for the unambiguous Doppler velocity. When the optimal ambiguity number is determined through the non-limiting example optimization operation which will be described below, one of the candidates for the unambiguous Doppler velocity may be finally determined to be the unambiguous Doppler velocity.

The second ambiguous Doppler velocities may be expressed by Equation 7 below, for example. Equation 7 may be derived based on Equations 9 and 10 described below, for example.

$$v_{D2,amb} = v_{D1,amb} + \frac{q \cdot (2v_{D1,max}) \cdot f_{shift}}{f_{c2}} \quad \text{Equation 7}$$

In Equation 7, $v_{D2,amb}$ denotes the second ambiguous Doppler velocities, and $f_{shift}$ denotes the deviation of a carrier frequency. $f_{shift}$ and $f_{c2}$ are system parameters and thus, may have fixed values. The radar signal processing apparatus may determine the second ambiguous Doppler velocities by changing the value of q. The candidates for the unambiguous Doppler velocity and the second ambiguous Doppler velocities depend on the first unambiguous Doppler velocity and the value of q and thus, may correspond to each other.

The radar signal processing apparatus may determine the Doppler velocity of the first target by performing a second frequency conversion 622 based on the second ambiguous Doppler velocities. Here, the determined Doppler velocity may be referred to as a first unambiguous Doppler velocity or simply as an unambiguous Doppler velocity. The second frequency conversion 622 may be a partial frequency conversion for the second chirp sequence signal. For example, the second frequency conversion 622 may include an operation of partially performing a frequency conversion (for example, FFT) only on a portion corresponding to the second ambiguous Doppler velocities in the second chirp sequence signal. The first frequency conversion 621 includes a frequency conversion for the entire first chirp sequence signal and thus, may be referred to as the overall frequency conversion so as to be distinct from the second frequency conversion 622.

The radar signal processing apparatus may determine the optimal ambiguity number using the second ambiguous Doppler velocities, and determine the Doppler velocity of the first target using the optimal ambiguity number. More specifically, the radar signal processing apparatus may map the second ambiguous Doppler velocities to a Doppler spectrum of the second chirp sequence signal, and determine an ambiguity number of a value that is the greatest on the Doppler spectrum among the second ambiguous Doppler velocities to be the optimal ambiguity number. In this case, the radar signal processing apparatus may partially derive values corresponding to the second ambiguous Doppler velocities on the Doppler spectrum, rather than obtaining the entire Doppler spectrum of the second chirp sequence signal. For example, the radar signal processing apparatus may perform a partial frequency conversion (for example, FFT) on the corresponding values. The operation of deriving the optimal ambiguity number may be expressed by Equation 8 below, for example.

$$q_{opt} = \arg\max_q S_D(v_{D2,amb}, q) \quad \text{Equation 8}$$

In Equation 8, $S_D$ denotes the Doppler spectrum of the second chirp sequence signal. The radar signal processing apparatus may determine the Doppler velocity of the first target based on the first ambiguous Doppler velocity, the optimal ambiguity number, and the maximum range. More specifically, the radar signal processing apparatus may determine the Doppler velocity of the first target by substituting these values into Equation 6.

The scheme of selecting a value having the highest likelihood for the Doppler spectrum of the second chirp sequence signal from among the second ambiguous Doppler velocities and determining an ambiguity number of the selected value to be the optimal ambiguity number may be referred to as backward q-estimation. Conversely, the scheme of determining an ambiguity number that minimizes a difference between the first ambiguous Doppler velocity and a primarily estimated Doppler velocity to be the optimal ambiguity number may be referred to as forward q-estimation. More specifically, for the forward q-estimation, the deviation of the Doppler frequency may be obtained through Equation 9 below, for example, and the primarily estimated value of the Doppler velocity may be derived through Equation 10 below, for example.

$$\Delta f = f_{D2,amb} - f_{D1,amb} = \frac{-v_{D,est} \cdot (2f_{shift})}{c} \qquad \text{Equation 9}$$

$$v_{D,est} = \frac{-\Delta f \cdot c}{(2f_{shift})} = \frac{v_{D2,amb} \cdot f_{c2} - v_{D1,amb} \cdot f_{c1}}{f_{c2} - f_{c1}} \qquad \text{Equation 10}$$

In Equation 9, $\Delta f$ denotes the deviation of the Doppler frequency, $f_{D1,amb}$ denotes a first ambiguous Doppler frequency, $f_{D2,\,amb}$ denotes a second ambiguous Doppler frequency, $v_{D,est}$ denotes the primarily estimated Doppler velocity, and c denotes the speed of light. Since the first ambiguous Doppler frequency and the second ambiguous Doppler frequency are sensitive to noise interference, the primarily estimated Doppler velocity needs to be corrected, and the optimal ambiguity number may be derived through Equation 11 below, for example.

$$q_{opt} = \arg\min_{q} |v_{D1,unamb} - v_{D,est}| \qquad \text{Equation 11}$$

Equation 11 determines an ambiguity number that minimizes a difference between the first ambiguous Doppler velocity and the primarily estimated Doppler velocity to be the optimal ambiguity number. In Equation 11, $q_{opt}$ denotes the optimal ambiguity number. A secondary Doppler velocity may be estimated by substituting the first ambiguous Doppler velocity, the optimal ambiguity number, and the maximum range into Equation 6. The estimated secondary Doppler velocity may correspond to an unambiguous Doppler velocity. As described above, the forward q-estimation may include an operation of obtaining the deviation of the Doppler frequency and the primarily estimated Doppler velocity, and determining the ambiguity number that minimizes the difference between the first ambiguous Doppler velocity and the primarily estimated Doppler velocity to be the optimal ambiguity number.

The forward q-estimation requires an operation of calculating a second range-Doppler map through an additional frequency analysis (for example, two-dimensional FFT) for the second chirp sequence signal to primarily estimate the Doppler velocity, determining targets through correspondence matching between the first range-Doppler map and the second range-Doppler map, and obtaining the frequency deviation between the targets. A number of operations are needed to calculate the second range-Doppler map, and the difficulty in correspondence matching increases significantly as the number of targets increases. Also, the forward q-estimation has a high dependence on the dimension of FFT. Through backward q-estimation, the radar signal processing apparatus of one or more embodiments may minimize frequency analysis operations, omit correspondence matching, and reduce the dependence on the dimension of FFT.

Figure 7:
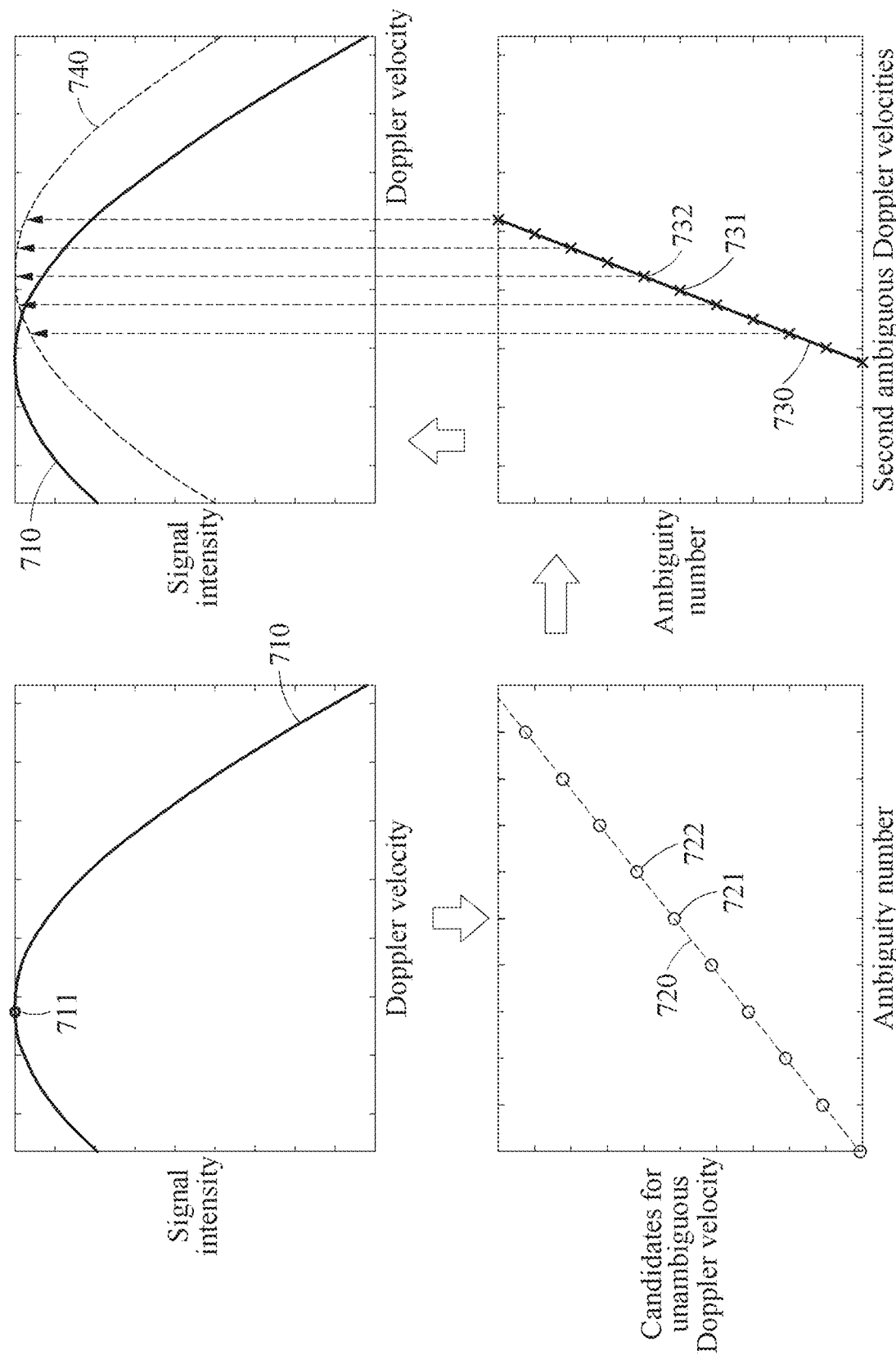
FIG. 7 illustrates an example of an operation of estimating an ambiguity number backward.

FIG. 7 illustrates an example of an operation of estimating an ambiguity number backward. Referring to FIG. 7, a radar signal processing apparatus may obtain a Doppler spectrum 710 and a first ambiguous Doppler velocity 711 of a first chirp sequence signal. For example, the radar signal processing apparatus may obtain the Doppler spectrum 710 through a first frequency conversion for the first chirp sequence signal, and determine the maximum value on the Doppler spectrum 710 to be the first ambiguous Doppler velocity 711.

The radar signal processing apparatus may obtain a curve 720 including candidates 721 and 722 for an unambiguous Doppler velocity based on the first ambiguous Doppler velocity 711. For example, the radar signal processing apparatus may derive the curve 720 by substituting the first ambiguous Doppler velocity 711 and the maximum range of the Doppler velocity into Equation 5 and changing the ambiguity number.

Further, the radar signal processing apparatus may obtain a curve 730 representing or including second ambiguous Doppler velocities 731 and 732 based on the first ambiguous Doppler velocity 711. For example, the radar signal processing apparatus may derive the curve 730 by substituting the first ambiguous Doppler velocity 711, the maximum range of the Doppler velocity, the deviation of a carrier frequency, and a second carrier frequency into Equation 7 and changing the ambiguity number. The candidates 721 and 722 for the unambiguous Doppler velocity and the second ambiguous Doppler velocities 731 and 732 depend on the first ambiguous Doppler velocity and the ambiguity number and thus, may correspond to each other. It is also possible to obtain the curve 730 directly without obtaining the curve 720.

The radar signal processing apparatus may find an ambiguity number of a value that is the greater on a Doppler spectrum 740 of the second chirp sequence signal among the second ambiguous Doppler velocities 731 and 732 while mapping the second ambiguous Doppler velocities 731 and 732 to the Doppler spectrum 740, and determine the found ambiguity number to be an optimal ambiguity number. The radar signal processing apparatus may derive a portion of the Doppler spectrum 740 considering a portion corresponding to the second ambiguous Doppler velocities 731 and 732 in the second chirp sequence signal, rather than deriving the entire Doppler spectrum 740 considering the entire second chirp sequence signal. The radar signal processing apparatus may determine the unambiguous Doppler velocity through the first ambiguous Doppler velocity 711, the optimal ambiguity number, and the maximum range of an unambiguously measurable Doppler velocity.

Figure 8:
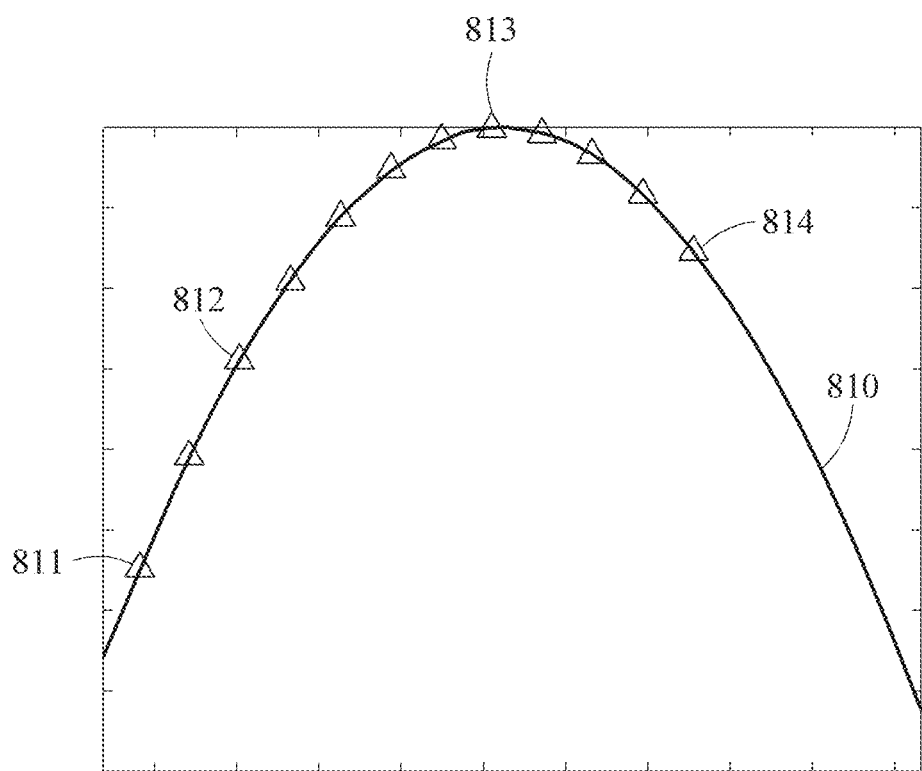
FIG. 8 illustrates an example of an operation of specifying an optimal ambiguity number.

FIG. 8 illustrates an example of an operation of specifying an optimal ambiguity number. Referring to FIG. 8, second ambiguous Doppler velocities are mapped to a Doppler spectrum 810 of a second chirp sequence signal. As expressed by Equation 7 above, the second ambiguous Doppler velocities may be derived by changing an ambiguous number. Thus, each of the second ambiguous Doppler velocities has a corresponding ambiguity number. For example, second ambiguous Doppler velocities 811, 812, 813, and 814 may be determined through ambiguity numbers of −1, 1, 6, and 10. Among the determined second ambiguous Doppler velocities, the second ambiguous Doppler velocity 813 derived through the ambiguity number of 6 corresponds to the greatest value, and thus, the ambiguity number of 6 may be determined to be the optimal ambiguity number.

Figure 9:
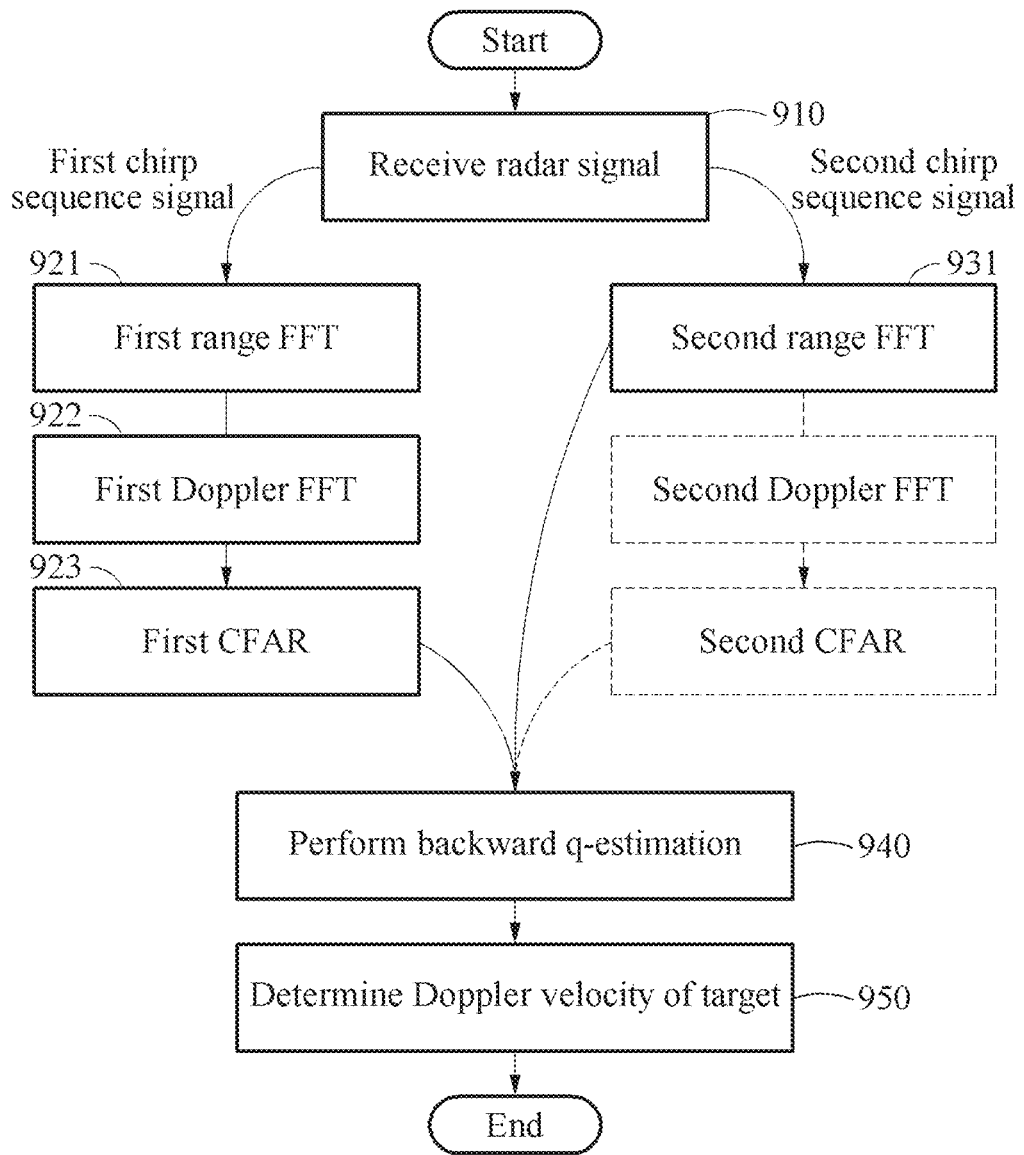
FIG. 9 illustrates an example of operations related to chirp sequences, respectively.

FIG. 9 illustrates an example of operations related to chirp sequences, respectively. Referring to FIG. 9, in operation 910, a radar signal processing apparatus may receive a radar signal. The radar signal may include a first chirp sequence signal and a second chirp sequence signal. The radar signal processing apparatus may perform operations 921 to 923 on the first chirp sequence signal. Operation 921 is a first range FFT, operation 922 is a first Doppler FFT, and operation 923 is a first CFAR detection. The radar signal processing apparatus may extract the first chirp sequence signal from the radar signal, perform a range FFT on the first chirp sequence signal, and perform a Doppler FFT on a result of the range FFT. As a result, a range-Doppler map may be generated. The radar signal processing apparatus may detect a target by performing CFAR detection based on the range-Doppler map.

The radar signal processing apparatus may perform operation 931 on the second chirp sequence signal. Operation 931 is a second range FFT. A range spectrum may be derived according to the result of the range FFT. Unlike the first chirp sequence signal, a second Doppler FFT and a second CFAR detection for the second chirp sequence signal may not be performed. Forward q-estimation requires an operation of calculating a second range-Doppler map through an additional frequency analysis (for example, two-dimensional FFT) for the second chirp sequence signal to primarily estimate the Doppler velocity, determining targets through correspondence matching between the first range-Doppler map and the second range-Doppler map, and obtaining the frequency deviation between the targets. For this, a second Doppler FFT and a second CFAR detection for the second chirp sequence signal may be performed. Conversely, backward q-estimation of one or more embodiments does not require this process. Thus, an additional frequency conversion operation for the second chirp sequence signal may not be performed. In operation 940, the radar signal processing apparatus performs backward q-estimation on each target. In operation 950, the radar signal processing apparatus determines the Doppler velocity of each target.

Figure 10:
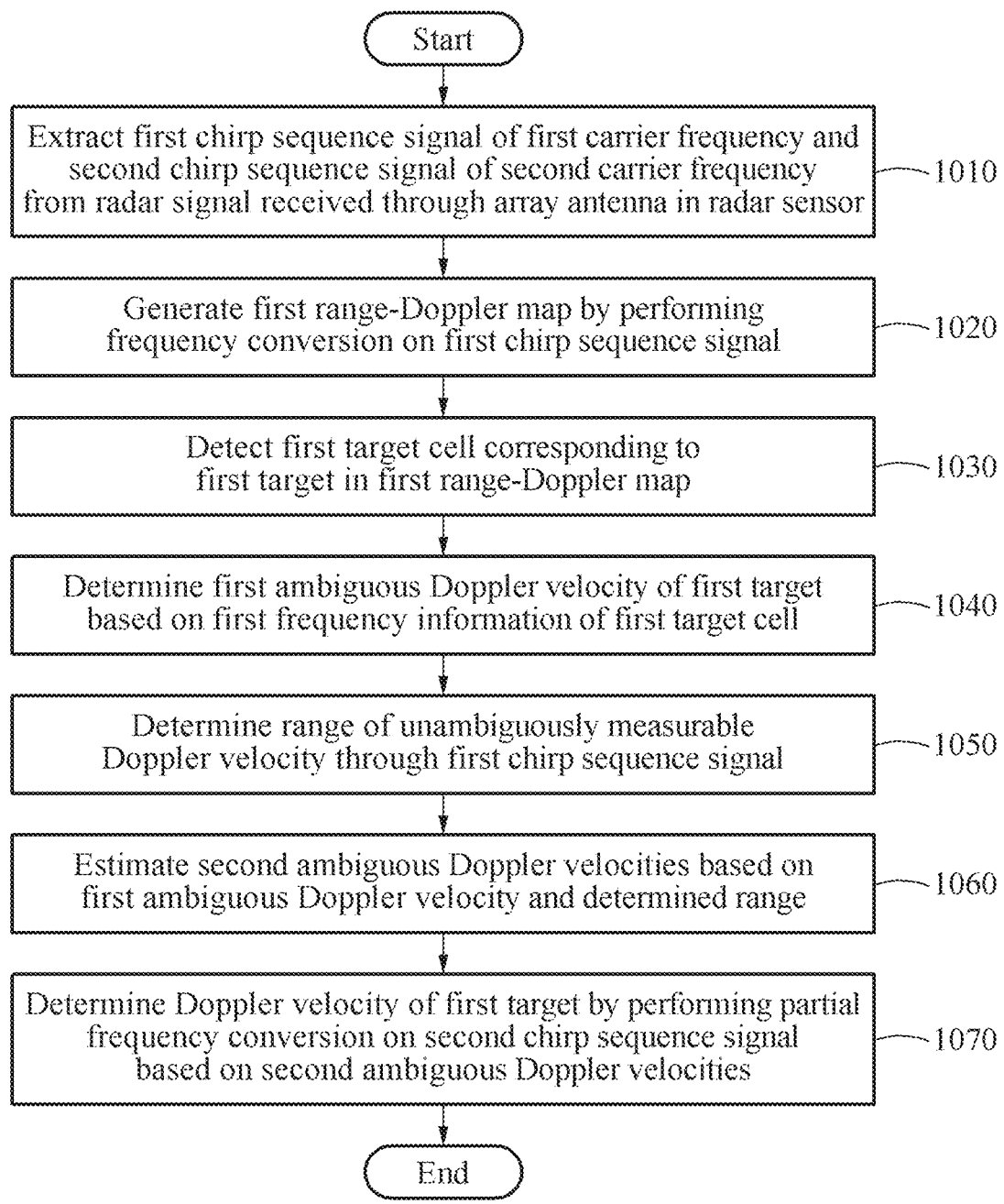
FIG. 10 illustrates an example of a radar signal processing method.

FIG. 10 illustrates an example of a radar signal processing method. Referring to FIG. 10, in operation 1010, a radar signal processing apparatus may extract a first chirp sequence signal of a first carrier frequency and a second chirp sequence signal of a second carrier frequency from a radar signal received through an array antenna in a radar sensor. The array antenna may include a plurality of transmission antenna elements and/or a plurality of reception antenna elements, and an antenna signal may be received through any one of the reception antenna elements. Further, first chirps of the first chirp sequence signal and second chirps of the second chirp sequence signal may appear alternately in the radar signal.

In operation 1020, the radar signal processing apparatus may generate a first range-Doppler map by performing frequency conversion on the first chirp sequence signal. For example, the frequency conversion may include a two-dimensional FFT operation including a range FFT and a Doppler FFT. In operation 1030, the radar signal processing apparatus may detect a first target cell corresponding to a first target in the first range-Doppler map. To this end, the radar signal processing apparatus may perform a CFAR detection operation based on the first range-Doppler map.

In operation 1040, the radar signal processing apparatus may determine a first ambiguous Doppler velocity of the first target based on first frequency information of the first target cell. The first target cell may correspond to the greatest value on a Doppler spectrum of the first chirp sequence signal, and the first frequency information may indicate the greatest value. In operation 1050, the radar signal processing apparatus may determine the range of an unambiguously measurable Doppler velocity through the first chirp sequence signal. Here, the range may be determined based on a chirp repetition period of the first chirp sequence signal, and unambiguity and ambiguity may be concepts based on aliasing.

In operation 1060, the radar signal processing apparatus may estimate second ambiguous Doppler velocities based on the first ambiguous Doppler velocity and the range. The second ambiguous Doppler velocities may correspond to candidates for an unambiguous Doppler velocity. In operation 1070, the radar signal processing apparatus may determine a Doppler velocity of the first target by performing partial frequency conversion on the second chirp sequence signal based on the second ambiguous Doppler velocities. The radar signal processing apparatus may determine an optimal ambiguity number based on the second ambiguous Doppler velocities, and determine the Doppler velocity of the first target using the optimal ambiguity number.

Figure 11:
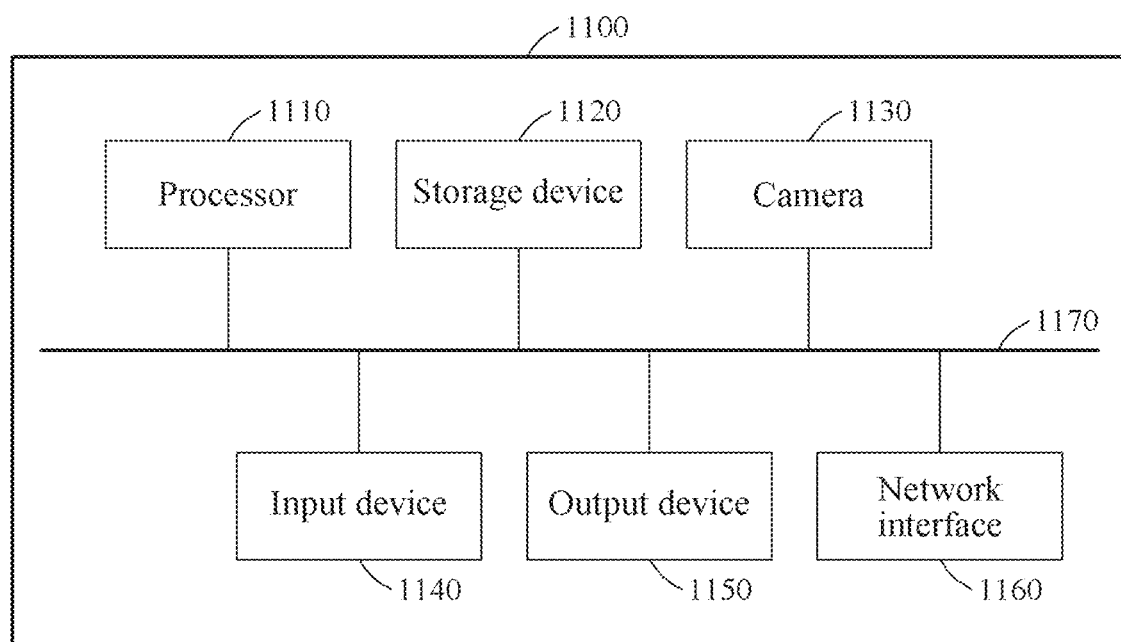
FIG. 11 illustrates an example of a configuration of an electronic device.

FIG. 11 illustrates an example of a configuration of an electronic device. Referring to FIG. 14, an electronic device 1100 may perform the radar signal processing method described above. For example, the electronic device 1100 may functionally and/or structurally be or include the radar signal processing apparatus 200 of FIG. 2. The electronic device 1100 may be, for example, an image processing device, a smart phone, a wearable device, a tablet computer, a netbook, a laptop, a desktop, a personal digital assistant (PDA), a head-mounted display (HMD), a vehicle (for example, autonomous vehicle), and a driver-assistance device to be mounted on a vehicle.

Referring to FIG. 11, the electronic device 1100 may include a processor 1110 (e.g., one or more processors), a storage device 1120 (e.g., one or more memories), a camera 1130, an input device 1140, an output device 1150, and a network interface 1160. The processor 1110, the storage device 1120, the camera 1130, the input device 1140, the output device 1150, and the network interface 1160 may communicate with each other through a communication bus 1170.

The processor 1110 may execute instructions or functions to be executed in the electronic device 1100. For example, the processor 1110 may process the instructions stored in the storage device 1120. The processor 1110 may perform the operations described through FIGS. 1 to 10.

The storage device 1120 stores information or data necessary for the execution of the processor 1110. The storage device 1120 may include a computer-readable storage medium or a computer-readable storage device. The storage device 1120 may store instructions to be executed by the processor 1110 and may store related information while software and/or an application is executed by the electronic device 1100.

The camera 1130 may capture an image including a plurality of image frames. For example, the camera 1130 may generate a frame image.

The input device 1140 may receive an input from a user through a haptic, video, audio, or touch input. The input device 1140 may include a keyboard, a mouse, a touch screen, a microphone, or any other device that detects the input from the user and transmits the detected input.

The output device 1150 may provide an output of the electronic device 1100 to the user through a visual, auditory, or haptic channel. The output device 1150 may include, for example, a display, a touch screen, a speaker, a vibration generator, or any other device that provides the output to the user. The network interface 1160 may communicate with an external device through a wired or wireless network. The output device 1150 may provide a result of processing radar data to the user using any one or more of visual information, auditory information, and haptic information.

For example, when the electronic device 1100 is mounted on a vehicle, the electronic device 1100 may visualize a radar image map through a display. As another example, the electronic device 1100 may change any one or any combination of the velocity, the acceleration, and the steering of the vehicle equipped with the electronic device 1100 based on DOA information, range information, and/or the radar image map. However, examples are not limited thereto, and the electronic device 1100 may perform functions such as ACC, AEB, BSD, LCA, and ego-localization. The electronic device 1100 may structurally and/or functionally include a controller for such control of the vehicle.

The radar signal processing apparatus 110, radar sensor 111, radar signal processing apparatus 200, radar sensor 210, processor 220, radar sensor 310, chirp transmitter 311, duplexer 312, antenna 313, frequency mixer 314, amplifier 315, radar signal processor 316, electronic device 1100, processor 1110, storage device 1120, camera 1130, input device 1140, output device 1150, network interface 1160, communication bus 1170, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A radar signal processing method, comprising:
    determining a first ambiguous Doppler velocity of a target based on a range-Doppler map according to a first chirp sequence signal of a first carrier frequency;
    estimating second ambiguous Doppler velocities according to ambiguity of the first ambiguous Doppler velocity; and
    determining a Doppler velocity of the target based on an optimal ambiguity number determined by performing a partial frequency conversion on a second chirp sequence signal of a second carrier frequency based on the second ambiguous Doppler velocities.

2. The method of claim 1, wherein the estimating the second ambiguous Doppler velocities comprises:
    determining a range of an unambiguously measurable Doppler velocity through the first chirp sequence signal; and
    estimating the second ambiguous Doppler velocities based on the first ambiguous Doppler velocity and the range.

3. The method of claim 2, wherein the range is determined based on a chirp repetition period of the first chirp sequence signal.

4. The method of claim 2, wherein the second ambiguous Doppler velocities correspond to candidates for the unambiguously measurable Doppler velocity.

5. The method of claim 1, wherein the determining of the Doppler velocity of the target comprises:
    Determining the optimal ambiguity number using the second ambiguous Doppler velocities; and
    determining the Doppler velocity of the target based on the optimal ambiguity number.

6. The method of claim 1, further comprising:
    extracting the first chirp sequence signal of the first carrier frequency and the second chirp sequence signal of the second carrier frequency from a radar signal received through an array antenna in a radar sensor; and
    generating the range-Doppler map by performing frequency conversion on the first chirp sequence signal.

7. The method of claim 1, wherein determining the first ambiguous Doppler velocity of the target comprises:
    detecting a target cell corresponding to a target in the first range-Doppler map; and
    determining the first ambiguous Doppler velocity of the target based on frequency information of the target cell.

8. The method of claim 1, wherein the determining of the Doppler velocity of the target comprises:
    determining a range of an unambiguously measurable Doppler velocity through the first chirp sequence signal;
    determining the optimal ambiguity number by performing the partial frequency conversion on the second chirp sequence signal based on the second ambiguous Doppler velocities; and
    determining the Doppler velocity of the target based on the first ambiguous Doppler velocity, the optimal ambiguity number, and the range.

9. The method of claim 8, wherein the determining of the optimal ambiguity number comprises:
    mapping the second ambiguous Doppler velocities to a Doppler spectrum of the second chirp sequence signal; and
    determining an ambiguity number of a value that is the greatest on the Doppler spectrum among the second ambiguous Doppler velocities to be the optimal ambiguity number.

10. The method of claim 1, wherein the ambiguity of the first ambiguous Doppler velocity and the second ambiguous Doppler velocities is a result of an aliasing effect.

11. A non-transitory computer-readable storage medium storing instructions that, when executed by a processor, configure the processor to perform the method of claim 1.

12. A radar signal processing apparatus, comprising:
    a radar sensor configured to receive a radar signal through an array antenna; and
    a processor configured to
        determine a first ambiguous Doppler velocity of a target based on a range-Doppler map according to a first chirp sequence signal of a first carrier frequency extracted from the radar signal;
        estimate second ambiguous Doppler velocities according to ambiguity of the first ambiguous Doppler velocity; and
        determine a Doppler velocity of the target based on an optimal ambiguity number determined by performing a partial frequency conversion on a second chirp sequence signal of a second carrier frequency based on the second ambiguous Doppler velocities.

13. The apparatus of claim 12, wherein, for the estimating the second ambiguous Doppler velocities, the processor is further configured to:
    determine a range of an unambiguously measurable Doppler velocity through the first chirp sequence signal; and
    estimate the second ambiguous Doppler velocities based on the first ambiguous Doppler velocity and the range.

14. The apparatus of claim 13, wherein the range is determined based on a chirp repetition period of the first chirp sequence signal.

15. The apparatus of claim 13, wherein the second ambiguous Doppler velocities correspond to candidates for the unambiguously measurable Doppler velocity.

16. The apparatus of claim 12, wherein, for the determining of the Doppler velocity of the target, the processor is further configured to:
    determine the optimal ambiguity number using the second ambiguous Doppler velocities; and
    determine the Doppler velocity of the target based on the optimal ambiguity number.

17. The apparatus of claim 12, wherein the processor is further configured to:
    extract the first chirp sequence signal of the first carrier frequency and the second chirp sequence signal of the second carrier frequency from a radar signal received through an array antenna in a radar sensor; and generate the range-Doppler map by performing frequency conversion on the first chirp sequence signal.

18. The apparatus of claim 12, wherein, for the determining the first ambiguous Doppler velocity of the target, the processor is further configured to:

detect a target cell corresponding to a target in the first range-Doppler map; and determine the first ambiguous Doppler velocity of the target based on frequency information of the target cell.

19. The apparatus of claim 12, wherein, for the determining of the Doppler velocity of the target, the processor is further configured to:

determine a range of an unambiguously measurable Doppler velocity through the first chirp sequence signal;

determine the optimal ambiguity number by performing partial frequency conversion on the second chirp sequence signal based on the second ambiguous Doppler velocities; and determine the Doppler velocity of the target based on the first ambiguous Doppler velocity, the optimal ambiguity number, and the range.

20. A vehicle, comprising:

a radar sensor configured to receive a radar signal through an array antenna;

a processor configured to determine a first ambiguous Doppler velocity of a target based on a range-Doppler map according to a first chirp sequence signal of a first carrier frequency extracted from the radar signal;

estimate second ambiguous Doppler velocities according to ambiguity of the first ambiguous Doppler velocity; and determine a Doppler velocity of the target based on an optimal ambiguity number determined by performing a partial frequency conversion on a second chirp sequence signal of a second carrier frequency based on the second ambiguous Doppler velocities; and a controller configured to control the vehicle based on the Doppler velocity.

* * * * *